United States Patent [19]
Yanagita et al.

[11] Patent Number: 5,460,876
[45] Date of Patent: Oct. 24, 1995

[54] MAGNETIC RECORDING MEDIUM

[75] Inventors: Takafumi Yanagita; Kunitsuna Sasaki, both of Hino, Japan

[73] Assignee: Konica Corporation, Japan

[21] Appl. No.: 100,932

[22] Filed: Aug. 2, 1993

[30] Foreign Application Priority Data

Nov. 5, 1992 [JP] Japan .................. 4-296033

[51] Int. Cl.$^6$ ............... B32B 5/16; G11B 5/66; B05D 5/12
[52] U.S. Cl. ............ 428/332; 428/336; 428/694 B; 428/694 BM; 428/694 BR; 427/127; 427/128; 427/131
[58] Field of Search ............ 428/694 B, 694 BM, 428/332, 336, 694 BR, 900; 427/127, 128, 131

[56] References Cited

U.S. PATENT DOCUMENTS

| | | | |
|---|---|---|---|
| 4,874,668 | 10/1989 | Asada et al. | 428/403 |
| 4,927,665 | 5/1990 | Chino et al. | 427/131 |
| 4,956,220 | 9/1990 | Sueyoshi et al. | 428/141 |
| 5,077,131 | 12/1991 | Nakano et al. | 428/423.9 |
| 5,093,193 | 3/1992 | Koyame et al. | 428/336 |
| 5,132,179 | 7/1992 | Hashimoto et al. | 428/403 |
| 5,141,808 | 8/1992 | Hashimoto et al. | 428/336 |

*Primary Examiner*—L. Kiliman
*Attorney, Agent, or Firm*—Jordan B. Bierman; Bierman and Muserlian

[57] ABSTRACT

A magnetic recording medium is disclosed. The magnetic recording medium is produced by coating the following magnetic paints on a support in the order from the support, a lower layer magnetic paint having a creep strain of 20% to 1000% determined in the conditions with nonvolatile content of the paint of 30 weight percent, a temperature 20°C, and a loading weight of 1 Pascal, and an upper layer magnetic paint having a creep strain of 10% to 500% determined in the same conditions.

5 Claims, 4 Drawing Sheets

PHASE DIFFERENCE : 0

PHASE DIFFERENCE : 90°

PHASE DIFFERENCE : 0°<PD<90°

MAGNETIC RECORDING MEDIUM

FIELD OF THE INVENTION

The present invention relates to a magnetic recording medium having high electromagnetic conversion properties appropriate for high density recording, and having capabilities of covering a broad recording wave range.

BACKGROUND OF THE INVENTION

With the pronounced tendency towards high quality magnetic recording media in recent years, it is strongly desired that magnetic recording discs and magnetic recording tapes having high electromagnetic conversion properties appropriate for high density recording be developed.

For the improvement in the electromagnetic conversion properties of magnetic recording media, there have so far been made a variety of attempts including use of magnetic powders having a high saturation magnetization strength, improvements in dispersability of magnetic powders, and as approaches to the improvement in magnetic layers, adoption of double-layered structure, enhancement of square ratio, coercive force, saturation magnetic flux density, and further adjustment of surface smoothness.

Covering a broad recording wave range requires that the magnetic layer be formed in double-layered structure. The expression "double-layered structure of the magnetic layer" indicates the layer structure comprising an upper magnetic layer covering short wave recording and a lower magnetic layer covering long wave recording.

Meanwhile, coating a double-layered recording medium has so far been practiced in a manner which repeats for each layer the procedure of coating and drying after that. This coating method, however, has disadvantages of poor productivity, poor capabilities of providing uniform coating, particularly uniformly thin coating, and liabilities to low electromagnetic properties. Accordingly, extrusion coating which allows simultaneous double-layer coating is being practiced.

In extrusion coating, a paint taken out of a paint reservoir is suddenly subjected to shearing force and stretching force by the edge of a coater head when it goes out of a slit and gets on a travelling support.

Since a paint for component layers such as magnetic layers is a non-Newtonian fluid, a measure with every regard to rheological characteristics is required in order to stretch a paint into a thin film in a moment from its three-dimensional liquid state.

Although the spreadability of a paint is an important technical factor in coating as described above, no study has so far been made from a viewpoint of the spreadability on coating of the component layers for recording media.

SUMMARY OF THE INVENTION

Accordingly, the object of the invention is to provide a magnetic recording medium having a good surface smoothness, high electromagnetic conversion properties, and capabilities of covering a broad recording wave range.

The object of the invention is attained by a magnetic recording medium produced by coating the following magnetic paints on a support in the following order from the support, a lower layer magnetic paint having a creep strain of 20% to 1000% determined, using a paint of a nonvolite content NV of 30 weight percent, at a temperature of 20° C. and at a loading weight of 1 Pascal, and an upper layer magnetic paint having a creep strain of 10% to 500% determined under the same conditions as the above.

DETAILED DESCRIPTION OF THE INVENTION

Figure 1:
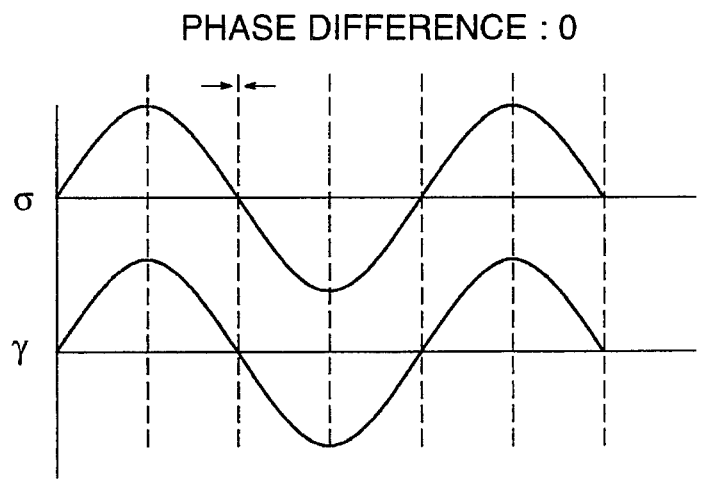
FIG. 1a is oscillation wave form of a perfect elastic body.
FIG. 1b is oscillation wave form of a perfect viscous body.
FIG. 1c is oscillation wave form of a perfect visco-elastic body.
Figure 1:
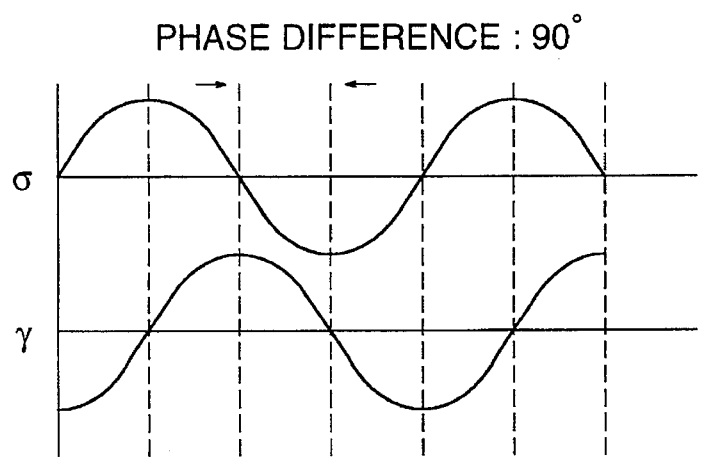
Figure 1:
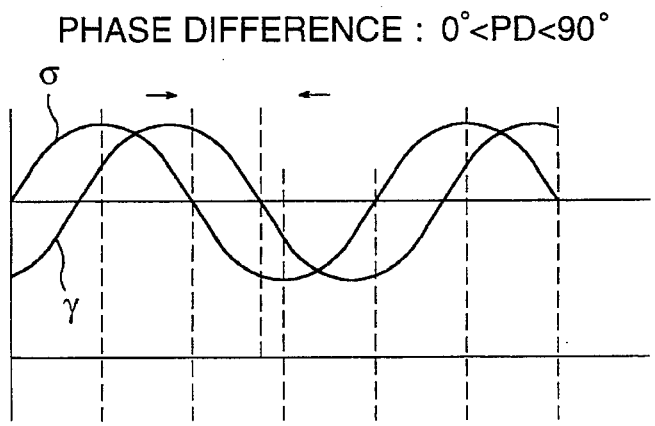

In working up the invention with the above object, the present inventors found that the creep strain was dualistic, and that the creep strain became higher, or the spreadability was improved, as the dispersion state of magnetic powder in a paint became better, and as the nonvolatile content or the ratio in percent of the weight of materials contained in the paint to the total weight of the paint (hereinafter referred to as NV) of a paint decreased. The nonvolatile content of a paint used here is the content of nonvolatile matters in a paint and indicates the portion other than organic solvents.

It was also found that in judging the dispersion state, the dispersion state of solid particles in a paint adjusted to a nonvolatile content of 30 wt % could be a reliable criterion. In other words, when a paint is in a good dispersion state at a nonvolatile content of 30 wt % the paint exhibits a good dispersion state likewise, even when the nonvolatile content is changed at the time of coating. Incidentally, the nonvolatile content during a coating process is preferably 10 to 40 wt %, and more preferably 20 to 30 wt %. Accordingly, the creep deformation ratio is also specified with its value at the nonvolatile content of 30 wt % used as a criterion.

In the invention, measurements of the above creep deformation ratio were made with a CSL-100 stress controlling type rheometer produced by CARRI-MED Co.
Measuring Conditions
Parallel plates: diameter: 4 cm, gap: 500 μm 20° C., 1 pascal An initial shear of 500 sec$^{-1}$ was exerted for 5 minutes, and measurement was made 10 seconds after that.

The creep strain of the magnetic paint can be adjusted by controlling the dispersion state of magnetic particles and the concentration of a binder, and by modifying the binder composition through selection of functional groups to be introduced into a binder resin.

Surface smoothness of the coated layer are improved by adjusting the creep strain of the magnetic paints for the upper and lower layers within the above-mentioned range.

Further, the dry coating thickness of an upper layer or a lower layer also exerts an influence upon the capability of covering a broad recording wave range. Since the upper layer covers the short wave range and the lower layer deals with the long wave range, the dry coating thicknesses of these layers are given so as to meet the respective wave ranges. The dry coating thickness of the upper layer is preferably 0.01 to 0.5 µm, more preferably 0.1 to 0.5 µm, and that of lower layer is preferably 0.5 to 6.0 µm.

In general, coating an upper layer with an extrusion coater to a dry coating thickness as thin as 0.01 to 0.5 µm is very difficult and often arouses troubles such as rough surface, uneven coating and coating streaks. Such troubles, however, can be mitigated by improving the spreadability of a paint as the present invention aims at and, thereby, a thin and double-layered magnetic recording medium having an excellent coating property can be produced.

Coating liquids of the magnetic paints of the invention for the upper layer and lower layers are each preferably prepared so as to have a NV value of 10 to 40 weight percent as foregoing. It is preferable that the coating liquids each has a dynamic modulus of elasticity G' of 1 to 100 Pa determined in the conditions with the vibration frequency of 0.1 Hz, the strain of 0.01 and the liquid temperature of 20° C. ±1° C.

The measurement of dynamic modulus of elasticities is described in detail.

It is known that in the case of a perfect elastic material, no phase difference (PD) appears between stress σ and strain γ exerted to a coating film as shown in FIG. 1-$a$, that in the case of a perfect viscous material, a PD of 90° arises as shown in FIG. 1-$b$, and that in the case of a visco-elastic material, the phase difference is given by 0° <PD<90° as shown in FIG. 1-$c$.

It is also known that when phase difference δ arises between the wave form of stress σ and the wave form of strain γ exerted to a coating film of visco-elastic material, the following relations are valid:

Complex modulus of elasticity $G^* = \sigma/\gamma$

Dynamic modulus of elasticity $G' = G^* \cos \delta$: elastic element

Loss modulus of elasticity $G'' = G^* \sin \delta$: viscous element

The measurement of G' is made under the following conditions:
Apparatus: stress controlling type viscometer
(Rheometer CSL-100 made by CARRI-MED Co.)
Measuring Mode: oscillation mode
Measurements of dynamic visco-elasticities under fixed conditions of vibration frequency at 0.1 Hz and strain at 0.01
Measuring Geometry: stainless steel parallel plates
diameter: 4 cm, gap: 500

The condition of G'=1.0 to 100 Pa of the coating liquid, can be made by properly selecting the kind and molecular weight of a binder as well as the content and dispersing degree of a magnetic powder and other fillers.

In embodying the invention, every conventional technique on magnetic recording media can be utilized as long as the foregoing conditions required by the invention are satisfied.

Next, the magnetic recording medium of the invention is described.

Non-magnetic Support

Materials suitable for the use of non-magnetic supports include, for example, polyesters such as polyethylene terephthalate, polyethylene-2,6-naphthalate; polyolefins such as polypropylene; cellulose derivatives such as cellulose triacetate, cellulose diacetate; and other plastics such as polyamide, polycarbonate.

The form of the non-magnetic support is not particularly limited, and it may be any of tapes, films, sheets, cards, discs and drums.

The thickness of the non-magnetic support is not particularly limited, either. When the support is used in the form of films or sheets, the thickness is usually 3 to 100 µm, and preferably 5 to 50 µm; in the form of discs or cards, it is in the range of 30 µm to 10 µm; and in the form of drums, it is properly selected so as to be compatible with a recorder to be used.

Further, these non-magnetic supports may be those which have undergone a surface treatment such as a corona discharge treatment.

For purposes of improving the running property of the magnetic recording medium, imparting an antistatic property and preventing imprint, it is preferred that a back coating layer be provided on the reverse side of the support where no magnetic layer is formed. Further, a subbing layer may be provided between the magnetic layer and the non-magnetic support.

Magnetic Powders

Ferromagnetic powders usable in the invention may be those which are employed as ferromagnetic powders for conventional magnetic recording media. Suitable examples include oxide magnetic substances such as $\gamma$-$Fe_2O_3$, Co-containing $\gamma$-$Fe_2O_3$, Co-coated $\gamma$-$Fe_2O_3$, $CrO_2$; and ferrites represented by magnetites such as $Fe_3O_4$, Co-containing $F_3O_4$, Co-coated $F_3O_4$.

In addition to the above, Example of ferromagnetic metal powders which can be used in the magnetic layer include metal magnetic powders of Fe or Co, as well as those whose primary components are Fe, Ni and Co, namely magnetic powders of Fe—Al type, Fe—Al—Ni type, Fe—Al—Zn type, Fe—Al—Co type, Fe—Al—Ca type, Fe—Ni type, Fe—Ni—Al type, Fe—Ni—Co type, Fe—Ni—Si—Al—Mn type, Fe—Ni—Si—Al—Zn type, Fe—Al—Si type, Fe—Ni—Zn type, Fe—Ni—Mn type, Fe—Ni—Si type, Fe—Mn—Zn type, Fe—Co—Ni—P type and Ni—Co type. Among them, Fe type metal powders have favorable electric characteristics—Preferred are Fe type metal powders containing Al atoms or an Al compound in their alloy structure. To be concrete, for improving the dispersing state of a paint, it is preferred that in the entire composition of a ferromagnetic metal powder, Fe and Al be present at a ratio of 2 to 10 parts of Al per 100 parts of Fe by weight, and that Fe and Al be localized so as to give an Fe:Al ratio of 30:70 to 70:30 in number of atoms present in the surface area less than 100 Å in terms of the analysis depth in an ESCA (electron spectroscopy for chemical analysis) of a ferromagnetic powder.

Ferromagnetic metal powders favorably used in the invention are those having an average major axial length of not more than 0.5 µm, preferably 0.01 to 0.4 µm and more preferably 0.01 to 0.3 µm measured on a transmission electron microscope, and an axial ratio (average major axial length/average minor axial length) not larger than 12 and preferably not larger than 10.

Preferred examples of ferromagnetic metal powders used in the invention are those Fe—Al type ferromagnetic metal powders which meet the requirements of Fe:Al ratio by weight in the total magnetic powder =100:4, Fe:Al ratio in number of atoms present in the surface layer of magnetic powder =50:50, average major axial length =0.16 µm, Hc=1580 Oe, and $\sigma_s$=120 emu/g.

Binders

Binders usable in the invention include, for example, polyurethanes, polyesters and vinyl chloride type resins such as vinyl chloride copolymers. Preferably, these resins contain a repeating unit having at least one polar group selected from —$SO_3M$, —$OSO_3M$, —COOM and —$PO(OM^1)_2$.

In these polar groups, M represents a hydrogen atom or an alkali metal atom such as Na, K or Li; $M^1$ represents a hydrogen atom, an alkali metal atom such as Na, K or Li, or an alkyl group The content of binder in the magnetic layer is usually 10 to 40 parts by weight, preferably 15 to 30 parts by weight, per 100 parts by weight of ferromagnetic powder.

These binders can be used not only singly, but also in combination of two or more types. In case of the combined use, the ratio of polyurethane and/or polyester to vinyl chloride type resin is usually within the range of 90:10 to 10:90 by weight, preferably within the range of 70:30 to 30:70.

In addition to the above resins, the following resins may also be used as binders in the invention.

Usable resins are those having a weight average molecular weight of 10,000 to 200,000; suitable resin types include vinyl chloride-vinyl acetate copolymers, vinyl chloride-vinylidene chloride copolymers, vinyl chloride-acrylonitrile copolymers, butadiene-acrylonitrile copolymers, polyamide resins, polyvinyl butyrals, cellulose derivatives such as nitrocellulose, styrene-butadiene copolymers, phenol resins, epoxy resins, urea resins, melamine resins, phenoxy resins, silicone resins, acrylic resins, urea-formamide resins and various synthetic rubbers.

Other Components

In the embodiment of the invention, there may be used, as other components, conventional additives such as durability improvers, dispersing agents, lubricants, abrasives, antistatic agents and fillers for the purpose of upgrading the quality of the magnetic layer.

Manufacture of Magnetic Recording Medium

In order to increase creep strain of the magnetic paint, it is necessary to improve the dispersibility of the magnetic powder in the paint. An improvement of dispersibility means can be attained by forming a stable and uniform binder layer on the surface of each particle of magnetic powder. The binder layer prevents each particle of magnetic powder from coagulating, resulting in paint which is stable in change with time.

For forming the stable and uniform binder layer, it is preferable that strong shearing force is given to both magnetic powder and a binder so that the binder is forced to adhere to the surface of a particle of magnetic powder.

In order to give the strong shearing force, it is preferable that kneaders shown below are used with a load equivalent to 0.05–0.5 kw per kg of magnetic powder for kneading.

A variety of kneaders and dispersers can be used to knead and disperse magnetic layer forming components.

Usable kneaders and dispersers are, for example, twin roll mills, triple roll mills, ball mills, pebble mills, conbble mills, Tron mills, sand mills, sand grainders, Sqegvari attritors, high-speed impeller dispersers, high-speed stone mills, high-velocity impact mills, dispers, high-speed mixers, homogenizers, supersonic dispersers, open kneaders, continuous kneaders and press kneaders. Among them, those are preferable which can provide a loading power consumption of 0.05 to 0.5 kw (per kg magnetic powder) such as press kneaders, open kneaders, continuous kneaders, twin roll mills and triple roll mills.

Figure 2:
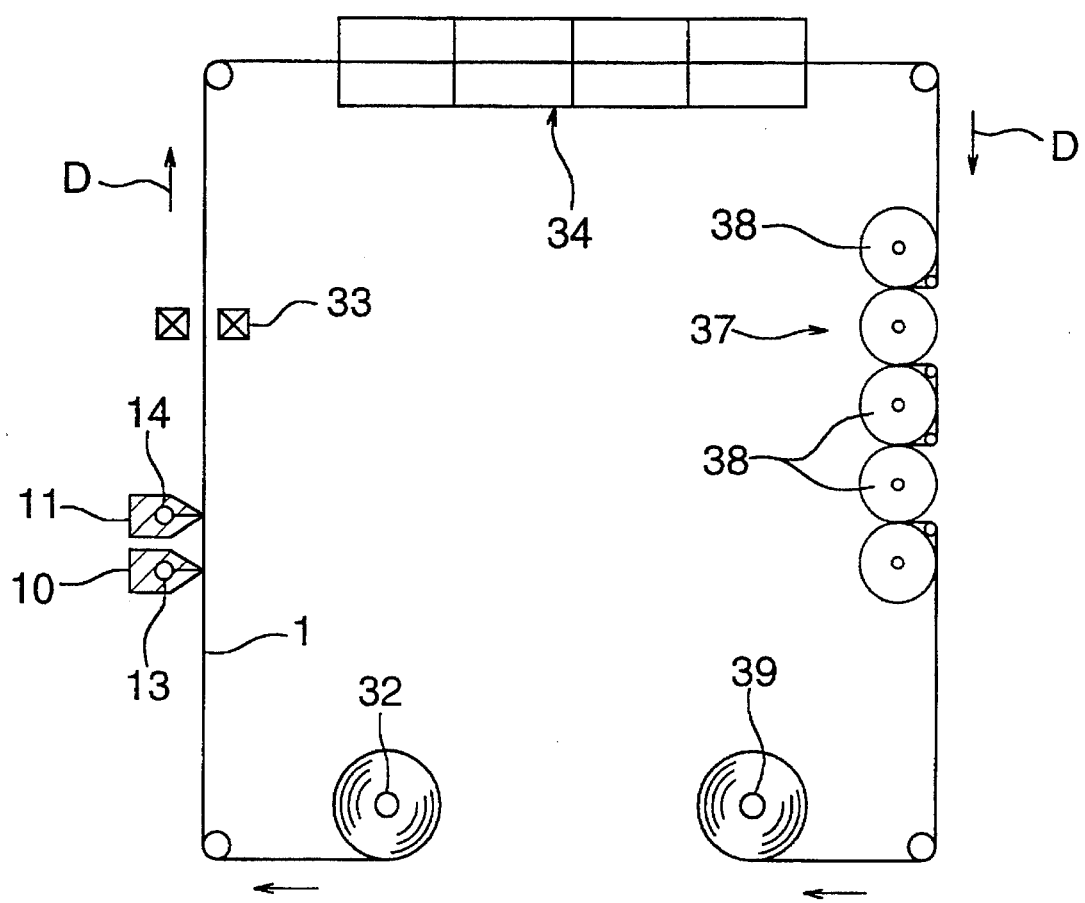
FIG. 2 is a schematic diagram of an extrusion wet-on-wet coating system for simultaneous double-layer coating of a magnetic layer.

Coating magnetic layers on a non-magnetic support is carried out, as shown in FIG.2, by the steps of coating paints for respective component layers simultaneously and double-layeredly on film support 1 delivered from feed roll 32 with extrusion coaters 10 and 11, passing the coated support 1 between orientating magnets or vertical orientating magnets 33, introducing support 1 into dryer 34 where it is dried with hot air blown from nozzles arranged up and down, taking support 1 carrying a dried coating layers to super calender 37 composed of calender rolls 38 for calendering, and then winding up the calendered support 1 on wind roll 39. The magnetic film so prepared is cut into tapes with a desired width, so that magnetic recording tapes, for example, 8-mm wide magnetic tapes for video camera are produced.

In FIG. 2, arrow D indicates the direction in which a non-magnetic support is conveyed. Extrusion coaters 10 and 11 are provided with paint reservoirs 13 and 14 respectively, and thereby paints from respective coaters are coated simultaneously and double-layeredly, that is, the upper layer is coated immediately after coating the lower layer, while the lower layer is in a wet state.

Figure 3:
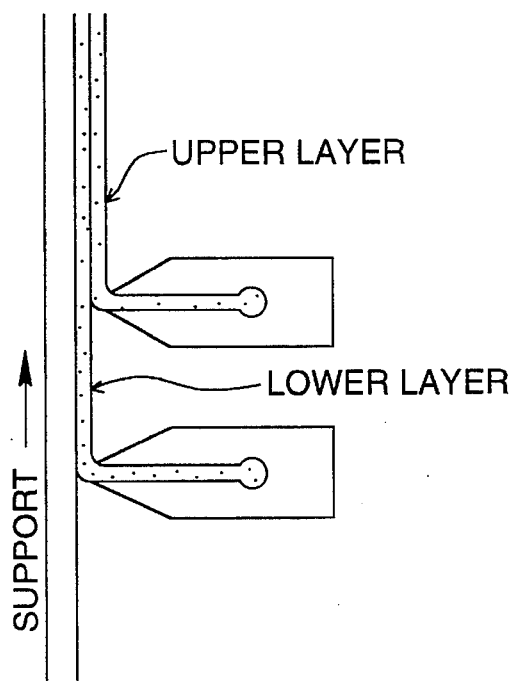
FIG. 3 shows coater heads for coating a paint.
Figure 3:
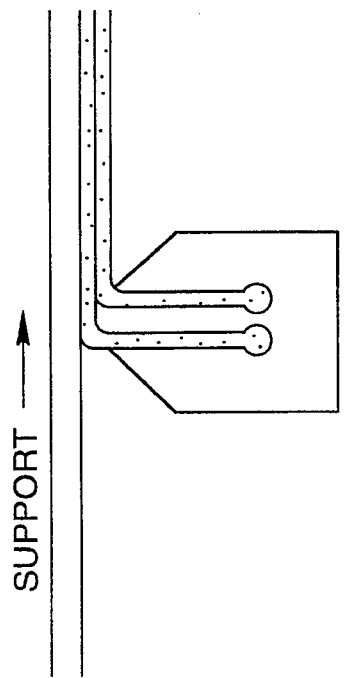
Figure 3:
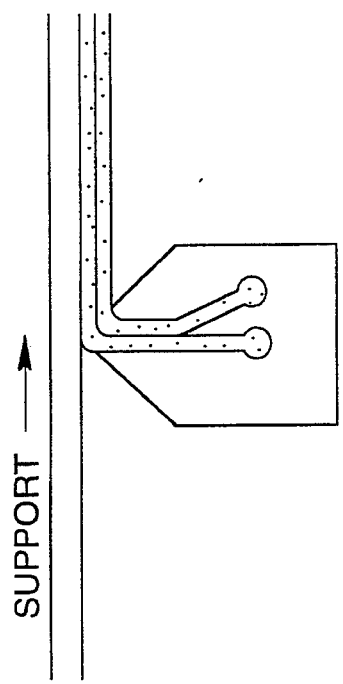

FIG. 3 shows coater heads suitable for the embodiment of the invention, but usable ones are not limited to them.

Solvents, suitable for compounding the foregoing magnetic paints or for diluting them at coating, include ketones such as acetone, methyl ethyl ketone, methyl isobutyl ketone, cyclohexanone; alcohols such as methanol, ethanol, propanol, butanol; esters such as methyl acetate, ethyl acetate, butyl acetate, ethyl lactate, ethylene glycol monoacetate; ethers such as glycol dimethyl ethers, glycol monoethylethers, dioxane, tetrahydrofuran; aromatic hydrocarbons such as benzene, toluene, xylene; and halogenated hydrocarbons such as methylene chloride, ethylene chloride, carbon tetrachloride, chloroform, dichlorobenzene. These solvents may be used singly or in combination of two or more kinds.

The intensity of a magnetic field set up by the foregoing orientating magnets or vertically orientating magnets is in the range of roughly 20 to 5,000 gausses; the drying temperature in the dryer is in the range of roughly 30 to 120° C.; and the drying time ranges from about 0.1 to 10 minutes.

In this simultaneous double-layer coating, the upper layer is coated while the lower layer is in a wet state, making the surface of the lower layer (the interface with the upper layer) smooth and improving the adhesion between the two layers. Accordingly, requirements in recording properties, including high output and low noise properties demanded of a magnetic tape for high density recording, are satisfied and, in addition, requirements for higher durabilities are also satisfied at the same time, because the delamination between the two layers is prevented and the strength of a magnetic layer is improved. Furthermore, using this simultaneous double-layer coating method also decreases dropouts, raising the reliability of magnetic recording media.

Surface Smoothing

In a preferred embodiment of the invention, the surface of the magnetic layer is smoothed by calendering.

That is, the surface roughness $R_{z(10)}$ of a magnetic layer is controlled within the range of preferably 5 to 20 nm, more preferably 12 to 15 nm.

Figure 4:
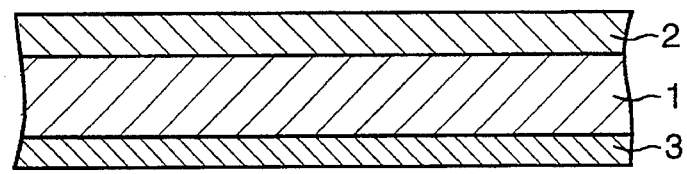
FIG. 4 is explanatory drawings for $R_{z(10)}$.
Figure 4:
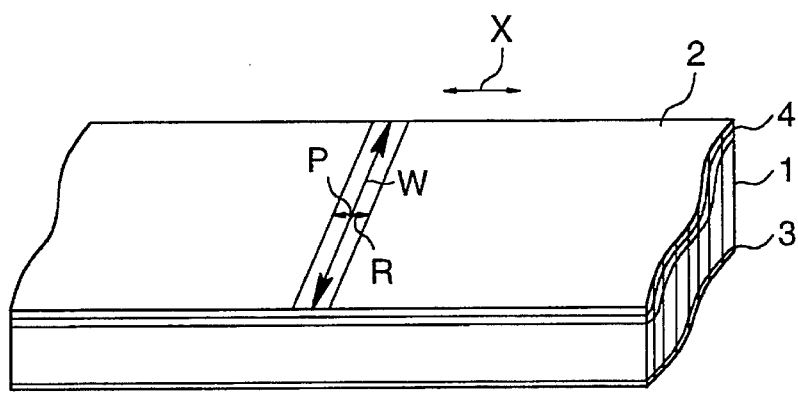
Figure 4:
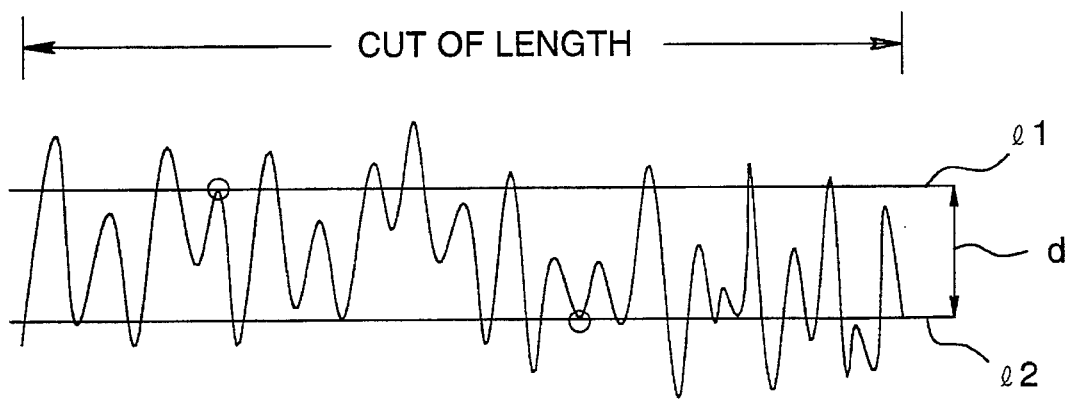

The term "surface roughness $R_{z(10)}$" used here indicates the value of difference in elevation d between straight line $l_1$ passing through the top of the 10th highest mountain and line $l_2$ passing through the bottom of the 10th deepest valley among straight lines parallel to the average direction of profile curves on the cutting plane, when a magnetic recording medium is cut off, as shown in FIG. 4, by a datum length in longitudinal direction X within the range of ±2 mm (indicated by R in the figure) from middle point P in cross direction W.

Measurements of $R_{Z(10)}$ are made with a under the conditions of stylus: 2.5×0.1 μm, stylus pressure: 2 mg, cut-off filter: 0.33 Hz, measuring speed: 2.5 μm/sec, and datum length: 0.5 mm. In a roughness curve obtained, irregularities not larger than 0.002 μm are disregarded.

One preferable manner to control the $R_{Z(10)}$ not more than 20 nm is to select calendering conditions properly in the manufacturing process described above so as to give a desired surface smoothness to a magnetic layer. That is, temperature, linear load and C/S (coating speed) must be appropriately controlled in calendering. Other than those in calendering, factors affecting the surface smoothness are kneading conditions and surface treatment of magnetic powder and sizes and amount of particles incorporated into a magnetic layer.

In order to obtain the above-mentioned preferable surface roughness, it is preferred that calendering be carried out at a temperature of 50 to 140° C., a linear load of 50 to 400 kg/cm and a C/S of 20 to 600 m/min.

A magnetic recording film obtained as above is varnished or bladed, if necessary, and then slit into tapes.

EXAMPLES

The invention is hereunder described with examples, in which all "parts" are parts by weight.

Magnetic paints of the following compositions were prepared.

| Magnetic Paints A1 to A7 for the Upper Layer | | |
|---|---|---|
| | A1–A6 | A7 |
| Fe—Al type magnetic metal powder (overall Fe:Al average ratio by weight: 100:4, Fe:Al ratio in number of-atoms in the surface layer: 50:50, BET value: 53 m²/g, Hc: 1760 Oe, average major axial length: 0.14 μm) | 100 parts | 100 parts |
| Polyvinyl chloride resin MR-110 (Nippon Zeon Co.) | 10 parts | 3 parts |
| Metal sulfonate containing polyurethane resin UR-8700 (Toyobo Co.) | 10 parts | 3 parts |
| α-Alumina (average particle size: 0.2 μm) | 8 parts | 8 parts |
| Stearic acid | 1 part | 1 parts |
| Butyl stearate | 1 part | 1 parts |
| Mixed solvent | X parts | |
| (a mixture of methyl ethyl ketone, toluene andcyclohexanone in equal volumes) | | |

*The amount of solvent X parts is added in parts in the processes of kneading and dispersing of a paint so that the NV of the paint is adjusted as follows.

After kneading the above compositions, 5 parts of a polyisocyanate compound (Coronate L, Nippon Polyurethane Ind.) was added as a curing agent to each of them to make them into coating liquid.

Magnetic Paints B1 to B5 for Lower Layer

Magnetic paints B1 to B4 and B5 were prepared in the same manner as magnetic paints A1 to A6 and A7, respectively, except that 100 parts of γ-$Fe_2O_3$, coercive force Hc: 700 Oe, BET value: 35 m²/g, axial ratio: 9, average major axial length: 0.27 μm was used in place of 100 parts of Fe-Al type magnetic metal powder.

The magnetic paints were prepared by the following knead-dispersing process or plain dispersion method without kneading.

The kneading, dispersing and finishing of the paints were carried out as follows:

| | Kneading → | Dispersing → | Finishing |
|---|---|---|---|
| (1) Knead-dispersing | solid matter + solvent (NV: 80 to 65 wt %) | addition of solvent (NV: 40 wt %) | addition of solvent and hardening agent (NV: 30 wt %) |
| (2) Plain dispersing | — | solid matter + solvent (NV: 40 wt %) | addition of solvent and hardening agent (NV: 30 wt %) |

The kneading was carried out by a press kneader with loading power consumption shown in Table 1. The kneading conditions and dispersing conditions of paints A1 to A6 and B1 to B4 are shown in Table 1. In paints A4 and B3, polyvinyl chloride resin MR-110 was replaced with the same amount of VAGH (vinyl chloride-vinyl acetate copolymer made by Union Carbide Corp.) The nonvolatile content of paint A6 was made 25 wt % in the finishing process. Thus obtained magnetic paints were subjected to measuring the creep deforming ratio in the prescribed conditions.

TABLE 1

| | Knead-dispersing Conditions | Loading power consumption for kneading (kw/kg) | Creep strain of liquid at NV 30 wt % |
|---|---|---|---|
| Paint for Upper Layer | A1 kneading at NV 80 wt % | 0.2 | 30 |
| | A2 kneading at NV 75 wt % | 0.1 | 15 |
| | A3 kneading at NV 65 wt % | 0.04 | 8 |
| | A4 kneading at NV 80 wt % | 0.2 | 3.5 |
| | A5 plain dispersing at NV 40 wt % | — | 5 |
| | A6 kneading at NV 65 wt % (NV 25 wt % in finished paint) | 0.04 | 25 |
| | A7 plain dispersing at NV | — | 550 |

TABLE 1-continued

|  | Knead-dispersing Conditions | Loading power consumption for kneading (kw/kg) | Creep strain of liquid at NV 30 wt % |
|---|---|---|---|
| Paint for Lower Layer | 40 wt % | | |
| | B1 kneading at NV 80 wt % | 0.2 | 60 |
| | B2 kneading at NV 75 wt % | 0.1 | 25 |
| | B3 kneading at NV 80 wt % | 0.2 | 5 |
| | B4 plain dispersing at NV 40 wt % | — | 17 |
| | B5 plain dispersing at NV 40 wt % | — | 1100 |

Using the coating layer combinations shown in Table 1, 8-mm wide magnetic recording media were prepared by simultaneous double-layer coating. For each magnetic recording medium, the $R_{z(10)}$ was measured, the state of surface was examined visually and with a microscope by counting the number of streak troubles, and the Rf out was determined. The results are shown in Table 2. The samples having streak troubles also had coating troubles such as cissing and color shading. The evaluation methods were as follows:

(a) State of Surface

The number of streaks in a 10-cm long area in the longitudinal direction was counted. Rating was made using the following three grades:

A: 0 to 1 streak,

B: 2 to 9 streaks,

C: 10 or more streaks (b) Rf Output

Measurements were made using a Shibasoku Noise Meter 925C and a Sony 8-mm Videomovie V-900.

TABLE 2

| Sample No. | Paints Used Upper Layer | Paints Used Lower Layer | State of Tape Surface | $R_{z(10)}$ (μm) | RF-Out | Remarks |
|---|---|---|---|---|---|---|
| 1 | A1 | B1 | A | 10 | 0.1 | * |
| 2 | | B2 | A | 13 | 0.0 | * |
| 3 | | B3 | C (cissing) | 29 | −1.0 | |
| 4 | | B4 | B (cissing) | 25 | −0.8 | |
| 5 | A2 | B1 | A | 12 | 0.0 | * |
| 6 | | B2 | A | 14 | −0.1 | * |
| 7 | | B3 | C (cissing) | 36 | −1.7 | |
| 8 | | B4 | C (cissing) | 29 | −1.1 | |
| 9 | A3 | B1 | A | 22 | −0.8 | |
| 10 | | B2 | B (shading) | 25 | −1.0 | |
| 11 | | B3 | C (streaking) | 39 | −2.8 | |
| 12 | | B4 | B (streaking) | 28 | −1.5 | |
| 13 | A4 | B1 | C (streaking) | 40 | −3.0 | |
| 14 | | B2 | C (streaking) | 48 | −3.5 | |
| 15 | | B3 | C (streaking) | 62 | −4.2 | |
| 16 | | B4 | C (streaking) | 45 | −3.3 | |
| 17 | A5 | B1 | A | 21 | −0.9 | |
| 18 | | B2 | B (streaking) | 25 | −1.1 | |
| 19 | | B3 | C (streaking) | 37 | −2.9 | |
| 20 | | B4 | C (streaking) | 32 | −2.6 | |
| 21 | A6 | B1 | A | 19 | −0.7 | |
| 22 | | B2 | B (shading) | 26 | −1.2 | |
| 23 | | B3 | B (cissing) | 30 | −1.4 | |
| 24 | | B4 | B (cissing) | 24 | −1.1 | |
| 25 | A7 | B1 | C (streaking) | — | — | |
| 26 | | B5 | C (streaking) | — | — | |

*invention

What is claimed is:

1. A magnetic recording medium produced by coating the following magnetic paints on a support in the following order starting with said support a first magnetic paint, forming a lower layer, having a creep strain of 20% to 1000% when said first paint has a non-volatile content NV of 30% by weight at a temperature of 20° C. and a loading weight of 1 Pascal, and a second magnetic paint, forming an upper layer, having a second creep strain of 10% to 500% when said second paint has an NV of 30% by weight at said temperature and said loading weight.

2. The medium of claim 1, wherein said upper layer and lower layer are simultaneously coated on said support.

3. The medium of claim 1, wherein said upper layer has a dry thickness of from 0.01 μm to 0.5 μm.

4. The medium of claim 1, wherein said lower layer has a dry thickness of from 0.5 μm to 6.0 μm.

5. The medium of claim 1, wherein said upper layer and lower layer are coated on said support by a extrusion coater.

* * * * *